United States Patent [19]

Erickson

[11] Patent Number: 4,610,558
[45] Date of Patent: Sep. 9, 1986

[54] SELECTIVELY FREE WHEELING OR DRIVE HUB FOR VEHICLES

[76] Inventor: Mervin L. Erickson, 930 Dakota Ave. South, Huron, S. Dak. 57350

[21] Appl. No.: 798,699

[22] Filed: Nov. 15, 1985

Related U.S. Application Data

[63] Continuation-in-part of Ser. No. 532,287, Sep. 15, 1983, Pat. No. 4,555,197.

[51] Int. Cl.[1] ............................. F16D 1/06; B60B 27/00
[52] U.S. Cl. ........................................ 403/1; 403/348; 192/67 R; 192/94; 192/95
[58] Field of Search ............................ 403/1, 348, 349; 192/67 R, 94, 95, 97; 301/1, 130; 411/553, 349, 549; 180/233, 247

[56] References Cited

U.S. PATENT DOCUMENTS

| | | | |
|---|---|---|---|
| 1,410,863 | 3/1922 | Woodson | |
| 2,844,238 | 7/1958 | Peterson | 192/94 X |
| 3,351,364 | 11/1967 | Warn et al. | 403/1 |
| 3,442,361 | 5/1969 | Hegar | 403/1 |
| 3,753,479 | 8/1973 | Williams | 403/1 X |
| 4,089,610 | 5/1978 | Kleespies et al. | 403/1 |
| 4,147,226 | 4/1979 | Kleespies et al. | 192/95 X |
| 4,266,646 | 5/1981 | Telford | 403/1 |
| 4,337,003 | 6/1982 | Juhl | 403/1 |
| 4,453,853 | 6/1984 | Gilcrest | 403/1 |

Primary Examiner—Cornelius J. Husar
Assistant Examiner—Todd G. Williams
Attorney, Agent, or Firm—Kinney & Lange

[57] ABSTRACT

The present invention discloses a self-contained hub assembly that can be placed onto the drive axles of a vehicle to provide either free wheeling of the wheel mounted on the hub or driving from the vehicle drive axle. An axle assembly includes a mounting flange and a shaft. A hub, upon which the vehicle wheel is mounted, is rotatably mounted on the shaft. A cap is selectively locked onto the shaft to engage a drive member, thereby transmitting the driving force of the vehicle axle to the hub and to the wheel.

7 Claims, 7 Drawing Figures

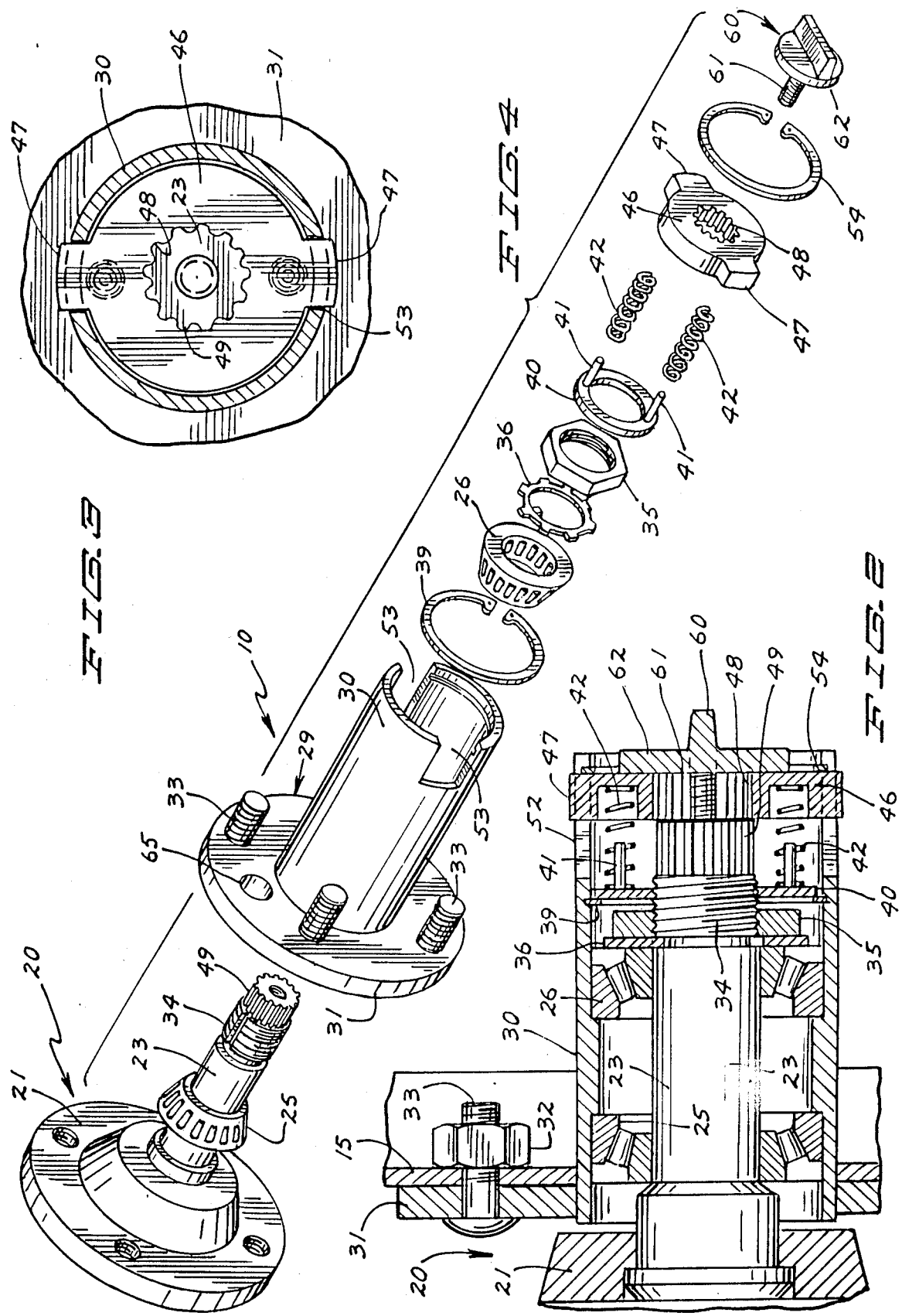

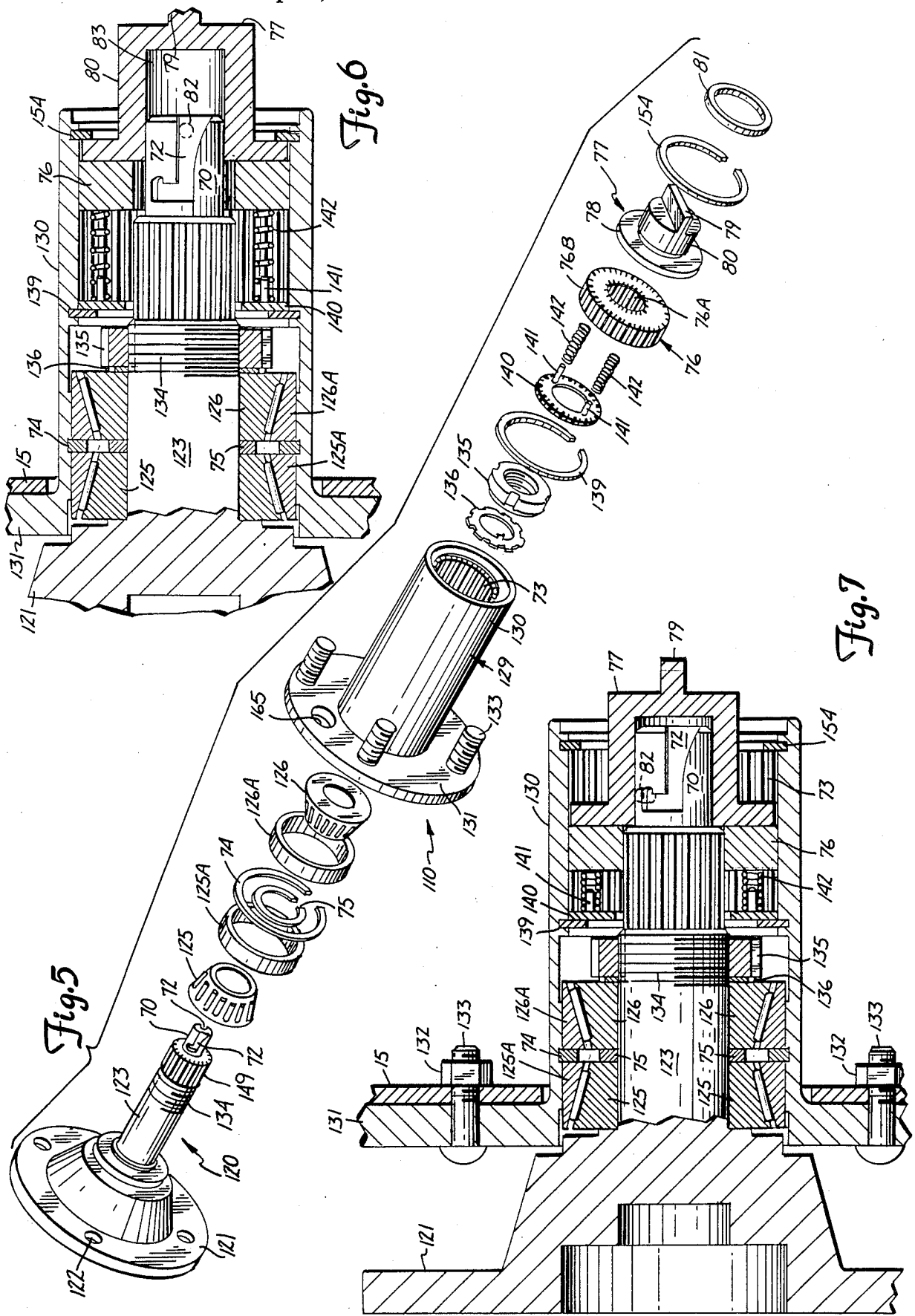

SELECTIVELY FREE WHEELING OR DRIVE HUB FOR VEHICLES

CROSS REFERENCE TO RELATED APPLICATIONS

This is a continuation-in-part of application Ser. No. 532,287 filed Sept. 15, 1983, now Pat. No. 4,555,197 patented Nov. 26, 1985.

BACKGROUND OF THE INVENTION

1. Field of the Invention

The present invention relates to a free wheeling adapter for permitting towing automotive vehicles without damage to the transmission and selectively to permit driving the vehicle.

2. Description of the Prior Art

Various selectively drive and/or free wheeling hub devices for use with automotive vehicles have been advanced. These devices are generally useful, but improvements in the mechanism for permitting driving the vehicle, and quickly releasing a hub for free wheeling still is a need. Further, the devices have to be easily attached to the existing wheel supports for the vehicle and cannot have excessive overhang on the axles, and thus must be compact in design, foolproof, and easily made for low cost.

Pat. No. 4,337,003, issued to Juhl on June 29, 1982 illustrates a selectively lockable or free wheeling device that is insertable between a vehicle wheel and its axle, and which includes a backing plate that mounts onto the wheel bolts of the vehicle. The backing plate carries a stub shaft or axle that is used for mounting a hub having a bolt circle identical to that of the wheel for the vehicle on which it is used so that the vehicle wheel can be mounted on the hub. The hub is normally free wheeling, but can be drivably coupled to the backing plate by the use of bolts that pass through the wheel bolt openings and the normally free wheeling hub to thread into the main support flange to effect a drive connection. This increases the difficulty of changing from a free wheeling system to a drive system when the vehicle is going to be driven, and increases the cost. Additionally, the provision of two separate wheel bolts is necessary, having different lengths, and if by accident one of the long bolts was used when free wheeling was desired, damage could result when the vehicle was towed or driven.

U.S. Pat. No. 4,266,646 to Telford illustrates a wheel hub that has a disengagable clutch or drive arrangement for free wheeling, and is designed to provide for a drive between a "live" vehicle axle and a hub. The drive is directly between the vehicle axle and the hub. It does use a spline arrangement for driving which can be engaged and disengaged. Springs are used to urge a drive nut into a lock or unlock position. However, it does not provide for a rapid connection to an existing automotive type wheel mounting which has a free wheeling hub in place on it.

U.S. Pat. No. 4,089,610 to Kleespies et al. illustrates a wheel hub that involves external clutching mechanisms. The device includes a sleeve with slots and a drive lug having ears extending radially. A spring forces the drive lug in the engaged position. While useful, the Kleespies device requires special adapters for the end of the vehicle driving hub and for connecting to the free wheeling hub.

Supplemental axles or emergency stub axles are shown in U.S. Pat. Nos. 1,410,863 to Woodson and 1,278,669 to Jacob. These show devices for mounting wheels on axles other than the primary axle provided on the vehicle, but do not show the free wheeling concept.

U.S. Pat. No. 3,251,630 to Astley shows a vehicle wheel assembly for a golf cart to permit towing such a golf cart without turning the differential or transmission by having a drive from the normally mounted wheel to the axle that can be released or disengaged.

The McReynolds device, U.S. Pat. No. 3,282,365, shows a golt cart having drive wheels that can be made freewheeling to facilitate towing of the cart. To disengage the driving wheel, a yoke must be removed from a freewheeling hub.

U.S. Pat. No. 1,904,371 to Hynan shows a demountable wheel lock that can be used for quick removal of the wheel, but does not show a free wheeling concept.

The Ponnequin device, U.S. Pat. No. 2,609,243, shows a splined sleeve used for engageing a splined axle on a freely rotating wheel. To allow freewheeling, a smooth collar is substituted for the sleeve. This device is not convenient for towing as disassembly is required.

U.S. Pat. No. 4,287,972 to Petrak shows an automatic clutch assembly whereby an annular, slotted cam gear causes a drive gear to move into locking engagement with a member to be driven automatically in response to application of torque to the drive gear. U.S. Pat. No. 4,327,821 to Telford shows an improved automatic locking clutch having a sliding clutch ring to minimize problems when a vehicle makes a transition from a two-wheel to a four-wheel drive mode.

Thus the art fails to show an easily used, readily made and conveniently attached hub that can be used for either drive or free wheeling operation such as that shown in the present device.

SUMMARY OF THE INVENTION

The present invention relates to a hub assembly that includes a first member and a second member that can be selectively made to be free wheeling relative to each other or in driving relationship. The first member is adapted to be mounted on the wheel bolts on the driving axle of a vehicle, and it has a stub axle on which the second member or hub is rotatably mounted. The second member or hub is used for mounting the wheel, and by selectively engaging or disengaging a drive coupling between the stub axle and the second member or hub, the wheel can be made free wheeling for towing the vehicle, or can be put into driving engagement when the vehicle is to be driven.

The hub assembly is easily used and more over is quite easily observed from the exterior to see if it is in a driving or free wheeling arrangement. Yet the hub provides positive positioning of the drive members for either engagement or disengagement so that there is no fear of damaging any members during operation or use.

The unit is easily manufactured, and is easily installed and used. Further, the changing from drive to free wheeling is easily accomplished.

BRIEF DESCRIPTION OF THE DRAWINGS

FIG. 1 is a vertical sectional view taken through a typical vehicle wheel hub, showing an assembly made according to the first embodiment of the present invention installed therein;

FIG. 3 is a sectional view taken as on line 3—3 in FIG. 1;

FIG. 4 is an exploded perspective view of the hub assembly made according to the first embodiment of the present invention;

FIG. 5 is an exploded perspective view of the hub assembly made according to the second embodiment of the present invention;

FIG. 6 is a sectional view of the hub assembly of FIG. 5 mounted on a vehicle wheel hub in the free wheeling position; and FIG. 7 is an enlarged sectional view of the hub assembly of FIG. 5 mounted on a vehicle wheel hub in the drive position.

DETAILED DESCRIPTION OF THE PREFERRED EMBODIMENTS

Figure 2:
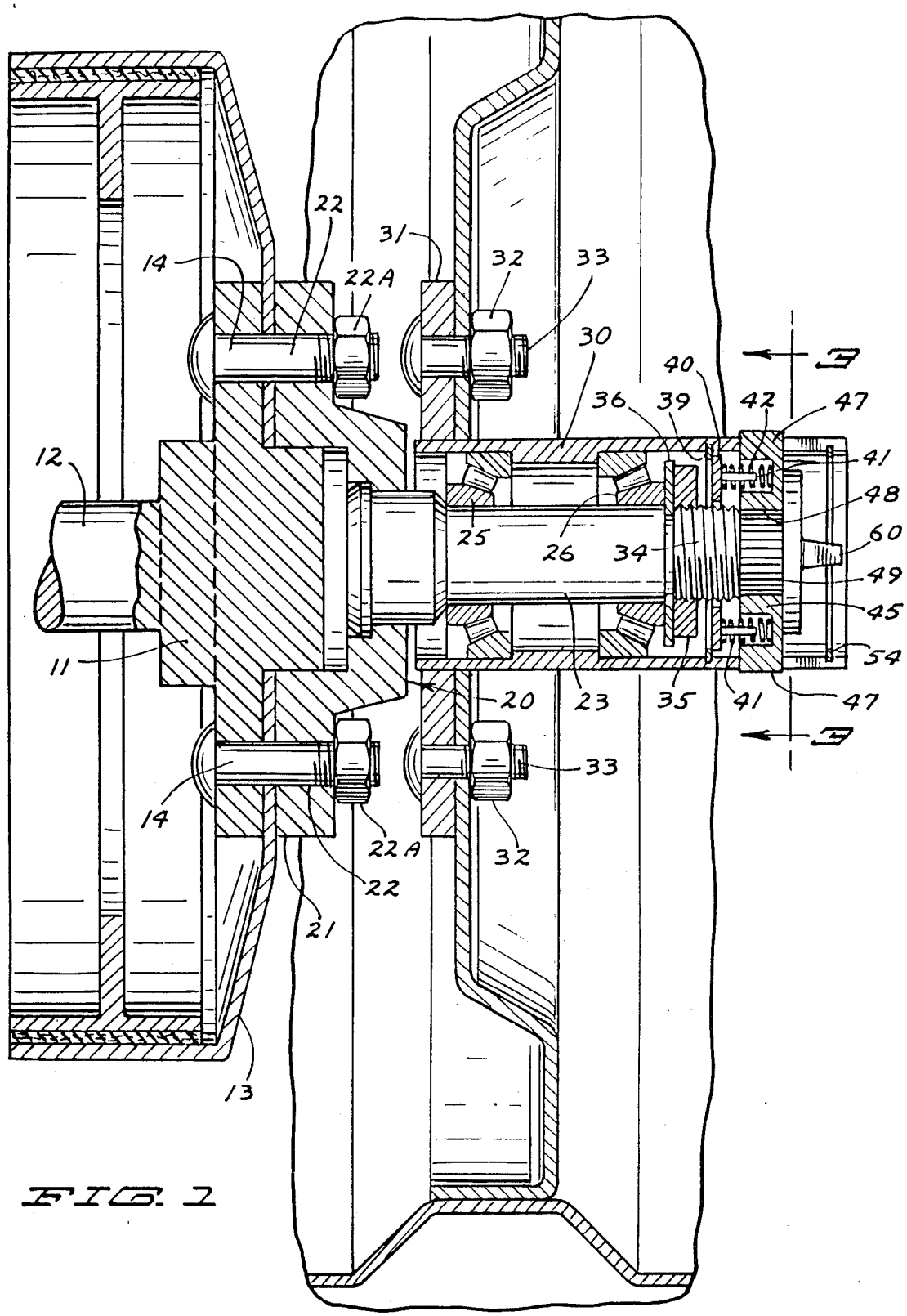
FIG. 2 is a fragmentary enlarged sectional view of a bearing arrangement of the assembly of FIG. 1 with the unit in free wheeling position.

The free wheeling hub assembly indicated generally at 10 is adapted to be connected to the wheel mounting flange 11 connected to a drive axle 12 of an automotive vehicle. The flange 11 has a brake drum 13 mounted thereon, and normally the flange 11 includes wheel bolts 14 that are used for attaching a vehicle wheel to the flange 11 in a normal manner. On small vehicles four bolt wheels are quite common at the present time.

The hub assembly indicated at 10 is used for providing a free wheeling connection from the flange 11 to a vehicle wheel indicated generally at 15, and to selectively permit a driving connection from flange 11 to the wheel 15.

The free wheeling hub assembly 10 includes a first stub axle assembly 20 including a mounting flange 21 that has bolt openings indicated at 22 to receive the wheel bolts 14, and as shown is capable of being attached thereto with lug nuts indicated at 22A. The stub axle assembly 20 includes a stub axle shaft 23 that is fixed to the mounting flange 21 in a suitable manner. The axle can be integrally machined with the flange, or welded to the axle. The stub axle is selected in length to permit supporting a pair of bearings 25, and 26.

An outer sleeve 30 also has a wheel support flange 31 fixed at one end thereof to form a free wheeling hub 29. The hub sleeve is mounted on the bearings 25 and 26 for rotational movement relative to the stub axle 23. The wheel 15 as shown is mounted on the wheel flange 31 and held in place with suitable lug nuts 32 mounted on bolts 33 that are attached to the wheel flange 31. Thus with the sleeve 30 installed with only the parts described so far, the wheel 15 is able to rotate relative to the flange 11 on the bearings 25 and 26.

The outer end of the stub axle 23 is threaded as shown at 34, and the threads in turn mount a bearing adjustment nut 35 that can be held in place with a locking washer 36 after the bearings 25 and 26 have been adjusted by use of the nut. The nut 35 holds the outer bearing in place on the axle. The outer races of the bearings are held in place in the hub 30. A snap ring 39 is mounted on the interior of the sleeve 30 and spring support washer 40 slips over the threaded portion of the stub axle 23 and fits closely on the interior surface of the hub sleeve 30 and abuts against the snap ring. The washer 40 is spaced axially from the nut 35 and the interior surfaces of the sleeve 30 keep the washer centered in the sleeve 30. The snap ring and washer rotate with the sleeve 30.

The washer 40 has a pair of support pegs 41 that are fixedly mounted thereon and face outwardly from the washer surface.

The spring support pegs 41 each have a coil spring 42 mounted thereon and extending in axial direction of the stub axle 23, and the springs in turn fit into receptacles on the inner face of a drive lug member 45. The lug member 45 is similar to a heavy washer, having a central portion 46 and a pair of opposed ears 47,47. An interior opening of the central portion 46 has an inner surface which is splined as shown at 48, and the spline 48 fits over an exterior spline shaped section 49 on the stub axle 23 near its outer end.

The ears 47,47 slidably fit within grooves or slots indicated at 53 defined in the outer end portions of the sleeve 30.

A snap ring 54 is provided on the interior of the sleeve 30 to the outside surface of the lug 45 to prevent excessive movement of the drive lug 45 outwardly from the hub sleeve 30 subsequent to assembly.

The axial position of the drive lug 45 relative to the stub axle 23 is controlled by actuator cap screw 60 which has a shank 61 that is threaded into a provided opening along the central axis of the stub axle 23. The cap screw 60 has a head or flange 62 that is of size to bear against the center portion 46 of the drive lug 45. The cap screw resists the resilient force of the springs 42 which tend to move the drive lug 45 outwardly (away from flange 21) from the end of the stub axle 23. The ears 47 on the drive lug 45 slide in the slots 53 of hub sleeve 30 and move easily under the urging of the springs 42 when the cap screw 60 is threaded outwardly so that the flange 62 permits the drive lug to be pushed axially by the springs. This will permit the interior spline 48 of the drive lug 45 to clear the spline 49 on the stub axle so that there is no driving engagement between the stub axle 23 and the drive lug. This is the free wheeling position as shown in FIG. 2 so that the hub sleeve 30 then freely rotates relative to the stub axle 23, and the wheel 15 can then turn easily on bearings 25 and 26 if the vehicle is being towed.

By threading the cap screw 60 inwardly (toward the flange 21), so that the flange 60 pushes the drive lug 45 inwardly and the interior spline 48 will mate with the exterior spline 49 on the stub axle 23 and a drive will be effected through the matings spline surfaces, and through the lugs 47 driving against the edges of the slots 53 to provide a drive connection to the hub sleeve 30. The vehicle then can be driven in a normal manner.

The positions of the drive connectors are positively determined by the spring pressure from springs 42 and by the cap screw 60, and there is no likelihood of any accidental engagement or disengagement during use. The snap ring 54 will keep the drive lug from moving completely out of the hub sleeve.

A second embodiment of the present invention, shown in FIGS. 5, 6 and 7, includes an alternative method of engaging the free wheeling hub assembly 110. As in the first embodiment described above, the hub assembly 110 includes a stub axle assembly 120 mounted to the drive axle of an automobile. The stub axle assembly 120 includes a mounting flange 121, bolt openings 122 and a stub axle shaft 123 having a threaded portion indicated at 134 and a splined portion indicated at 149 positioned outwardly beyond the threaded portion 134 and near the outer end of the axle shaft 123.

In the second embodiment, a stem 70 extends beyond the splined portion 149 of the shaft 123 and includes a pair of "J-shaped" recesses or slots 72,72 cut or machined out of the surface of the stem 70. The slots 72,72 begin at the outer tip of the stem 70 and are cut at a desired depth axially inwardly toward the mounting flange 121 and end in a hook or curved portion in a manner much like the bottom of the letter "J."

The axle shaft 123 supports a pair of bearings 125 and 126, as well as a pair of bearing races 125A and 126A placed between the bearings 125 and 126.

A free wheeling hub 129 is placed over the axle shaft 123. The hub 129 includes a wheel support flange 131, with bolts 133 and an outer sleeve 130. Lug nuts 132 may be mounted on the bolts 133 to hold the wheel 15 on the wheel flange 131. The interior wall of the outer sleeve is splined near the outer end as indicated at 73. A snap ring 74 is inserted into a groove in the inner wall of the outer sleeve 130 to hold the bearing 125 and race 125A in place. A spacer 75 is inserted between the bearings 125 and 126 on the axle shaft 123. The bearing 126 and race 126A are held in place and adjusted by a lock washer 136 and bearing adjustment nut 135 which is tightened on the threaded portion 134 of the axle shaft 123. The hub 129 is installed on the bearings 125 and 126 on the axle shaft 123 and freely rotates.

As with the first embodiment, a washer 140 having a pair of support pegs 141,141 slips over the splined portion 149 of the stub axle 123 and abuts against an internal snap ring 139. The washer 140 is splined around its outer circumference and mates with the splined portion 73 of the sleeve 130 to prevent the washer 140 from rotating or spinning about the stub axle 123. A drive member 76 is splined around an interior opening as shown at 76A and along the outer circumference as shown at 76B. Coil springs 142,142 mounted on the support pegs 141,141 urge the drive member 76 to move outwardly along the splined portion 73 of the sleeve 130 to a position wherein the drive member 76 clears the splines 149 on the axle shaft 123. The respective splines of the washer 140 and the drive member 76 mating with the splined portion 73 of the sleeve 130 prevent angular or rotational movement between the washer 140 and the drive member 76. Such an arrangement prevents twisting or angular deflection in the coil springs 142,142.

The axial position of the drive member 76 relative to the stub axle 123 is controlled by an actuator cap indicated generally at 77. The cap 77 includes a flange 78, a neck 80 and a handle 79. As shown in FIGS. 6 and 7, the neck portion 80 includes a recessed chamber or cavity 83 of sufficient size to receive the stem 70. Along the inner surface of the chamber 83 a pair of pins 82,82 are provided which extend radially inwardly into the chamber 83. As the cap 77 is pushed toward the axle shaft 123, the pins 82,82 slide in the slots 72,72 to engage the drive member 76 with the splines 149 on the axle shaft 123. The cap 77 is rotated clockwise on the stem 70 so that the pins 82,82 form what is known as a bayonet lock fit in the hook section of the slots 72,72. The cap 77 is held in place on the stem 70 to hold the drive member 76 in position to provide a drive connection between axle shaft 123 and sleeve 130.

As the cap 77 is locked on the stem 70, the flange 78 urges the drive member 76 axially along the sleeve 130 and causes the splined portion 76A of the drive member 76 to mate with the splines 149 of the axle shaft 23. The splined portion 76B of the member 76 remains engaged with the splines 73 of the outer sleeve during the axial travel caused by cap 77. When the drive member 76 is engaged on the splined portion 149 of the shaft 123, the free wheeling hub 129 is engaged and driven by the wheel 15. Thus, the rotation of the axle shaft 123 is transmitted to the drive member 76, which in turn, is transmitted to the hub 129.

To release the cap 77, the cap 77 is pushed axially inwardly and rotated counterclockwise so that the pins 82,82 slide out of the slots 72,72. The springs 142,142 urge the drive member 76 and the cap 77 axially outwardly along the splines 73 of the sleeve 130 to disengage the drive member 76 from the splines 149 of the axle shaft 123.

A seal 81 is provided to fit around a neck 80 of the cap and a snap ring 154 is inserted into the outer sleeve 130 in the portion outwardly beyond the splined portion 73. The snap ring 154 prevents the cap 77 from moving completely out of the hub sleeve 130 when the hub assembly 110 is in the free wheeling position.

In both embodiments of the present invention, a grease zerk can be provided through the walls of the hub sleeves 30 and 130 to insure that the interior bearings, and any thrust load between the washers 40 and 140 and the adjustment nuts 35 and 135 during free wheeling will be carried under lubrication.

In order to attach the flanges 21 and 121 onto the existing wheel bolts 14, apertures indicated at 65 and 165 are provided in the wheel flanges 31 and 131, between two of the lug bolts 33,33 and 133,133. The apertures or openings 65 and 165 are on the same bolt circle as the bolts 14 and are of such size so that a normal wrench holding a wheel lug nut 22 can be passed through the apertures 65 and 165. In this way the lug nuts can be tightened through apertures 65 and 165 without the need for cutaway portions of the flanges 31 and 131.

The unit is thus easily installed on existing automobiles and also easily removed if desired. The attachment to the flange 11 will be made without the wheel 15 in place on the flanges 31 and 131 so that the area is open for operation.

Although the present invention has been described with reference to preferred embodiments, workers skilled in the art will recognize that changes may be made in form and detail without departing from the spirit and scope of the invention.

What is claimed is:

1. An adapter assembly for mounting on an automobile driving axle and for receiving an automobile wheel to permit selective free rotation of the wheel comprising:
   (a) an axle assembly comprising a mounting flange and a shaft, said shaft extending substantially perpendicularly away from said mounting flange, said shaft including a stem on the end opposite said mounting flange and a splined portion positioned inwardly from and adjacent to said stem;
   (b) a hub rotatably mounted on said shaft comprising a wheel flange having bolts for receiving a wheel and a sleeve having a splined portion along an inner surface;
   (c) a drive member having a central opening and being axially slidably mounted on said shaft and within said sleeve, the perimeter of said opening having splines which cooperate with said splined portion of said shaft and the outer circumference of said drive member having splines which cooperate with said splined portion of said sleeve, said drive member being axially movable between a first drive position, wherein said drive member is engaged with said splined portions on both said sleeve and said shaft, and a second free wheeling position wherein said drive member is disengaged from one of the splined portions;
(d) spring means mounted within said sleeve for urging said drive member axially to its second freewheeling position;
(e) a cap axially slidably mounted on said stem of said shaft and within said sleeve and movable to force said drive member axially against the urging of said spring means and into its first drive position; and
(f) means for selectively locking said cap on said stem in the position holding said drive member in its first drive position.

2. The adapter assembly as recited in claim 1 and further comprising means for retaining said cap within said sleeve when said drive member is in its second freewheeling position.

3. The adapter assembly as recited in claim 1 wheren said cap has a recess with an internal surface substantially surrounding the stem.

4. The adapter assembly as recited in claim 3 wherein the means for selectively locking said cap on said stem comprises:
(a) at least one slot on the outer surface of said stem, said slot beginning at the outer end of said stem and extending axially inwardly toward said mounting flange and terminating in a hook portion; and
(b) at least one pin on the interior surface of said recess;
whereby said pin slides into said slot axially inwardly and when the cap is rotated said pin is moved into place in said hook portion of said slot and as said spring means urges said drive member and said cap axially outwardly the pin locks the cap in place.

5. The adapter assembly as recited in claim 2 wherein the means for retaining said cap comprises a snap ring inserted into a groove in said sleeve beyond said splined portion, said snap ring having an inner diameter smaller than said cap.

6. The adapter assembly as recited in claim 1 and further including an aperture in said wheel flange of said hub aligned with the bolts of the axle whereby a wrench may pass through said aperture to permit installation of and removal of said axle assembly.

7. The adapter assembly as recited in claim 1 wherein the spring means comprises
(a) a washer axially slidably mounted on said shaft and within said sleeve, said washer having splines around the outer circumference which cooperate with said splined portion of said sleeve;
(b) a plurality of support pegs, each support peg attached at a first end to a surface of said washer and extending substantially perpendicularly to a plane of said washer; and
(c) a plurality of coil springs, each spring having a diameter sufficient to accomodate the diameter of its respective support peg, each spring mounted over a second end of its respective support peg;
whereby, after the washer has been inserted in the splined portion of the sleeve with a coil spring mounted on each support peg, said coil springs act in concert to urge said drive member away from said washer.

* * * * *